US006671742B1

United States Patent
Cranor et al.

(10) Patent No.: US 6,671,742 B1
(45) Date of Patent: Dec. 30, 2003

(54) METHOD AND APPARATUS FOR UNIFIELD CONTROL AND DATA EVENT EXCHANGE IN A SOFTWARE SYSTEM

(75) Inventors: Charles D. Cranor, Morristown, NJ (US); Raman Gopalakrishnan, Tinton Falls, NJ (US); Peter Z. Onufryk, Flanders, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/548,893

(22) Filed: Apr. 13, 2000

Related U.S. Application Data
(60) Provisional application No. 60/139,355, filed on Jun. 15, 1999.

(51) Int. Cl.[7] .................................................. G06F 9/46
(52) U.S. Cl. ........................................ 709/318; 709/314
(58) Field of Search ................................ 709/313, 314, 709/318, 310, 319

(56) References Cited

U.S. PATENT DOCUMENTS

| | | | | | |
|---|---|---|---|---|---|
| 4,369,494 A | * | 1/1983 | Bienvenu et al. | ........... | 713/400 |
| 5,434,975 A | * | 7/1995 | Allen | ........................ | 709/312 |
| 5,448,734 A | * | 9/1995 | Hrabik et al. | ............... | 709/314 |
| 5,485,617 A | * | 1/1996 | Stutz et al. | ................. | 709/315 |
| 5,828,882 A | * | 10/1998 | Hinckley | .................... | 709/318 |
| 5,881,315 A | * | 3/1999 | Cohen | ......................... | 710/52 |
| 5,887,168 A | * | 3/1999 | Bahls et al. | ................ | 709/314 |
| 5,905,890 A | * | 5/1999 | Seaman et al. | ............. | 717/122 |
| 5,999,986 A | * | 12/1999 | McCauley III et al. | ..... | 709/310 |
| 6,212,676 B1 | * | 4/2001 | Seaman et al. | ............. | 717/116 |
| 6,363,435 B1 | * | 3/2002 | Fernando et al. | ........... | 709/318 |
| 2002/0144014 A1 | * | 10/2002 | West | .......................... | 709/318 |

OTHER PUBLICATIONS

Rothwell, Charlie. "COOL C++ Library Overview." Internet publication. 1995.*
Schmidt, Douglas C. "An OO Encapsulation of Lightweight OS Concurrency Mechanisms in the ACE Toolkit." 1995.*
Hall, Martin et al. "Windows Sockets, An Open Interface for Network Programming under Microsoft Windows." Version 1.1. Jan. 20, 1993.*
Stevens, W. Richard. "Unix Network Programming". Prentice–Hall Software Series. 1990.*

* cited by examiner

*Primary Examiner*—John Follansbee
*Assistant Examiner*—Lewis A. Bullock, Jr.

(57) ABSTRACT

An event exchange mechanism for software systems is disclosed that utilizes a receiver-driven, publisher-subscriber model to overcome various problems in the prior art. The event exchange has a flexible addressing scheme so that a sending module need not be aware of all of its receiving modules. Yet, the event exchange still provides the ability to multicast messages to interested receivers. The system is also uniform since both data and control information can be exchanged using the same mechanism. Mechanisms for flow control are also provided so that a receiver can exert backpressure on a sender; this is especially useful for the transfer of multimedia data.

32 Claims, 2 Drawing Sheets

| SENDING MODULE NAME | SEND PORT NAME | QUEUE LENGTH | RECEIVING MODULE NAME | RECEIVING PORT NAME |
|---|---|---|---|---|
| MICROPHONE | AUDIO_OUT | 10 | MIXER | MASTER_IN |
| TONE GENERATOR | TONE_OUT | 10 | MIXER | SLAVE_IN |
| MIXER | AUDIO_OUT | 10 | SPEAKER | AUDIO_IN |
| MIXER | AUDIO_OUT | 10 | NETWORK | DATA_IN |
| CONTROLLER | VOLUME | 1 | MIXER | VOLUME_IN |

FIG. 3

| EVX FUNCTION | DESCRIPTION |
| --- | --- |
| evx_init | Initializes EVX's global state. |
| evx_connect | Establish a connection between a sending port and a receiving port. Ports are referenced by their string names. Data structures are allocated when the port is referenced in a evx_connect call. |
| evx_initsp | Initializes a sending port. This includes setting the port's queue length. |
| evx_initrp | Initializes a receiving port. |
| evx_post | Post an event to a sending port. This blocks if the port's event queue is full and the non-blocking flag is not set. Optionally, evx_post will wait until the event is delivered, providing synchronous semantics. |
| evx_receive | receive an event from a port. If there is no pending event, then evx_receive returns null. When a receiver finishes processing an event it must call evx_ack to acknowledge it. |
| evx_ack | release a receiver's reference to a received event, allowing EVX to recycle the event for future use. Optionally the sender may request a callback when the event is freed. |
| evx_swalloc | Allocate a new semaphore-wait object. These objects allow a thread to block waiting for events on the associated port(s). An object can be associated with a pipe, allowing a thread to use select to simultaneously wait for an event and I/O. |
| evx_swadd | Add a receive port to a semaphore-wait object. A receive port is associated with only one object at a time. |
| evx_swremove | Remove a receive port from a semaphore-wait object. |
| evx_swwait | Wait for an event to arrive on one of the receive ports added to the specified semaphore-wait object. |
| evx_swget | Get a list of receive ports that have pending events from a semaphore-wait object. |
| evx_swpipefd | Return the pipe file descriptor associated with the specified semaphore-wait object so that a client may select on it. |

METHOD AND APPARATUS FOR UNIFIELD CONTROL AND DATA EVENT EXCHANGE IN A SOFTWARE SYSTEM

CROSS REFERENCE TO RELATED APPLICATIONS

This application claims priority to Provisional Application Serial No. 60/139,355, filed on Jun. 15, 1999, the content of which is incorporated by reference herein.

FIELD OF THE INVENTION

The present invention relates generally to software systems, and, more particularly, to communication between modules in a software system.

BACKGROUND OF THE INVENTION

Software systems often consist of a number of independent modules, otherwise referred to as components or processes, etc. The modules comprising the system may be part of the same address space or may be partitioned across different address spaces. Each module typically consists of one or more threads. Modules, although independent of each other, often need to exchange data and control events so that they can work together in concert. Two well known methods for communication between modules are the use of procedure calls and message passing.

Procedure calls can be used when modules are in the same address space. The advantage of procedure calls is simplicity and efficiency. Procedure calls, however, are unsuitable in many situations. The use of procedure calls to effect event exchange between modules causes unnecessarily tight coupling among modules. Procedure calls have to be resolved at build time and therefore modules cannot be easily added or removed from the system. Moreover, the synchronous nature of the procedure call mechanism implies that events are processed in the context of the calling module leading to temporal coupling between event generating and consuming modules. This is undesirable in real-time embedded systems since a higher priority activity in a module can miss its deadline if it calls procedures in an unrelated module. In addition, procedure calls are unsuitable when multiple modules are required to consume an event, or when the sending module cannot—or need not—know which other modules need to see the event. An alternative to procedures statically linked at compile time are dynamically linked libraries ("DLLs"). Although DLLs allow procedures to be updated after compile time, they do not allow the fundamental interconnection between modules to be modified after compile time. In addition, the other difficulties associated with procedures described above remain.

An alternative is to use message queues per module to decouple the sending module from the receiving module. However, simple message passing creates its own problems. The sender has to know the address of the receiver to send messages to the appropriate receive queue. Having a single queue per receiver, can cause priority inversion because higher priority messages could be queued behind low priority ones in the receiver's message queue. In addition, most message passing implementations copy data twice—once from the sender to an intermediate buffer and once more from the buffer to the receiver. Since memory copies are expensive, this can cause performance problems, especially in resource-limited environments such as embedded systems.

One could use more sophisticated forms of message passing based on ideas such as remote procedure calls, remote method invocations, and distributed object technology. However, all of these are meant for large applications that are distributed on multiple machines. These systems are meant to scale to large applications and have a lot of heavyweight mechanisms. These systems, in short, impose too much overhead for embedded systems and resource constrained environments.

SUMMARY OF THE INVENTION

An event exchange mechanism is disclosed that utilizes a receiver-driven, publisher-subscriber model to overcome various problems in the prior art. The event exchange has a flexible addressing scheme so that a sending module need not be aware of its receiving modules. In addition, the event exchange provides the ability to multicast messages to interested receivers. Mechanisms for flow control are also provided so that a receiver can exert backpressure on a sender, which is especially useful for the transfer of multimedia data. The system provides a uniform mechanism for control and data exchange.

In one aspect of the present invention, the idea of "blindcasting" is adapted and utilized to address individual software modules. A sending module need not be aware of its receivers and merely posts an event at a sending port, and the event exchange delivers the event to one or more receiving ports. The event exchange enables arbitrary interconnections between the modules. It supports one-to-many and many-to-one communication. Furthermore, moving the inter-connection of modules to the event exchange has the advantage of permitting the fundamental inter-connection of modules in a system to be modified after compile time. Zero-copy reference count-based mechanisms can be utilized for efficiency. In one embodiment of the invention, the connectivity between ports of different modules is specified in a connection table; in another, smart modules may be utilized to ascertain and establish the connectivity; in yet another, one or more modules may be responsible for establishing connections between modules.

These and other advantages of the invention will be apparent to those of ordinary skill in the art by reference to the following detailed description and the accompanying drawings.

BRIEF DESCRIPTION OF THE DRAWINGS

FIG. 3 is a table of event exchange functions forming an application programming interface in accordance with a preferred embodiment of the present invention.

DETAILED DESCRIPTION

Figures 1, 2:
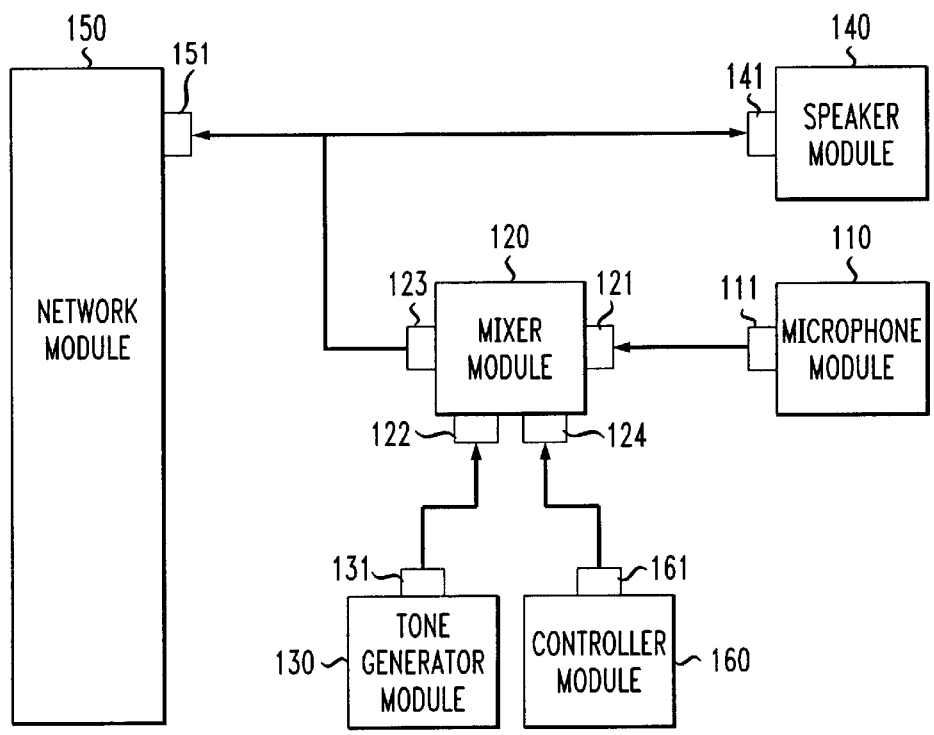
FIG. 1 is an abstract diagram of a communication application comprising various inter-connected software modules.
FIG. 2 is an example of a connection table, in accordance with a preferred embodiment of the present invention.

A software application designed in accordance with an embodiment of the present invention is composed of independent modules and an event exchange, further described below. FIG. 1 illustrates, for example, a communication application comprising six modules: a microphone module 110, a mixer module 120, a tone generator module 130, a speaker module 140, a network module 150, and a controller module 160. Each module, for example, can be a software object, identified by a class name and an instance name. In accordance with a preferred embodiment of the present invention, each module has send and receive ports that are identified using port names. Each port has a character string name and an associated port data structure. It is preferable that the event exchange manages connections between ports so that instance names do not have to be hardwired into the modules.

A software developer determines which modules are needed for the application and how they interconnect. Interconnections can be determined when the application is initially written, in a runtime configuration, or while the system is running. In one embodiment of the present invention, the connectivity between ports of different modules can be specified by a connection table, as further described below. Each module has an initialization routine. This routine is called for each module instance and is driven using the connection table. The initialization routine typically initializes the ports of the module instance and creates one or more threads to process messages received on its ports. The queue size of the sending ports can be set at initialization to provide flow control and to prevent the module from exhausting memory resources. The queue size can also be set dynamically and the flow control (described in greater detail below) can be switched on or off, depending on the needs of the particular module.

FIG. 2 sets forth an example of a connection table for the application structure set forth in FIG. 1. It demonstrates the use of multiple named ports and multicasting (one-to-many) features provided by the present invention. As set forth above, the modules in this example application are a mixer, a microphone, a tone generator, a speaker, a network and a controller. The audio mixer receives audio data from a microphone and a tone generator, and mixes the two signals. It then sends the mixed signal to its output port. The mixed output is received by two other modules, namely the speaker and the network.

The microphone 110 has an output port called "audio_out" 111 on which it sends audio data. The connection table establishes a connection to the "master_in" receive port 121 of the mixer module 120. The tone generator module 130 has an output port called "tone_out" 131 on which it sends audio tones. The connection table establishes a connection between this port and the "slave_in" receive port 122 of the mixer module 120. The mixer module 120 also has an output port called "audio_out" 123 on which it sends the mixed signals received on its "master_in" 121 and "slave_in" 122 ports. The mixer output is "wired" by the connection table to the speaker module 140 at its "audio_in" receive port 141. The speaker module 140 plays the audio on the local speaker. The mixer output is also connected by the connection table to the network module 150 in its "data_in" receive port 151. It sends the audio over the network to another machine. Finally, there is a module called controller 160 that controls the volume of the mixer output. It has a send port called "volume" 161 that is connected by the connection table to the mixer 120 in its "volume$_{13}$ in" receive port 124.

The connection table in FIG. 2 sets forth all of the connections described above as well as the queue lengths for the corresponding send ports. As can be seen from both Figures, the mixer 120 has three input ports and one output port. Moreover, the output from the mixer is multicast to two other modules, demonstrating the one-to-many interconnection feature of the present invention.

Although the above detailed description uses a connection table to specify the connectivity between module ports, other embodiments may be utilized as well that would also be contemplated as within the scope of the present invention. For example, "smart" modules may be utilized, designed with sufficient intelligence to determine what other modules are in the application and ascertain and configure the proper connectivity between each other.

Once the connectivity between ports is established, the individual modules can start posting events. A sender only needs to post an event to its send port, and the event is delivered by the event exchange runtime to all registered receiver ports. Events can thus be delivered to one or more receivers without the event-producing module having to explicitly manage its receivers. Events can be named independently of module function names or addresses allowing easy reconfiguration (this allows a module to be replaced without modifying other modules). Flow control prevents event producers, such as the tone generator in FIG. 1, from consuming all of the resources of the application.

Receivers process events and issue an acknowledgment. Receiving modules acknowledge event receipt to the event exchange runtime to enable it to garbage collect processed events. Explicit acknowledgments also allow flow control to be implemented in a natural manner. Thus, if a receiving module is falling behind, the sender module is prevented from posting more events. The sender module can then choose to block on output to its send port. In a preferred embodiment of the present invention, events can be processed by the event distribution mechanism at the priority of the receiving module. This is motivated by the need to support predictable processing for application modules that deal with media streams such as audio or video. Decoupling the priority of the sender from the priority at which the event is processed naturally lends itself to a multicast inter-process communication model since the same event can be processed at different priorities depending on the receiving module.

The event exchange can be advantageously utilized to exchange data as well as control information. Reference counts for events can be used to enable zero-copy operation. As is known in the art, the data can be passed by address, a pointer, etc. Delivering event data through a zero-copy reference count-based mechanism reduces the overhead of delivering an event to multiple modules. A flexible and efficient mechanism to simultaneously block on event exchange events as well as file descriptors can also be provided. Both blocking and non-blocking communication styles can be supported.

In another aspect of the present invention, the event exchange can decouple the specification of which receive ports a module is interested in for events, from the actual mechanism of waiting for these events. Most systems combine the two with the result that a module has to convey the set of events it is interested in every time it waits for events. If there are a large number of event sources, this is inefficient. The present invention avoids this problem by providing a "wait structure." A module that wishes to monitor multiple ports registers each port with the structure once. To wait for events, the module merely calls an event exchange function and specifies the wait structure as an argument.

The event exchange can also allow a module to wait simultaneously on events arriving on its receive ports as well as other events such as those from an I/O subsystem in an operating system. This can be accomplished with a slight extension to the general wait structure described above. The event exchange creates a "pipe" as a proxy for all the ports that the module wishes to monitor and returns it to the module. The module then treats this file descriptor in the same way as its other file descriptors. The module uses whatever operating system mechanism (for example, the "select" system call in the Unix operating system) to wait on these descriptors. Internally, when an event is posted for one of the selected receive ports, the event exchange runtime causes the proxy descriptor to become ready. The I/O subsystem informs the module about this condition at which point the module can determine using the event exchange application programming interface which of the receive ports represented by the proxy descriptor has waiting events.

The table in FIG. 3 shows a preferred embodiment of an advantageous application programming interface for an event exchange (denoted in the figure as "EVX" and "evx"). The main functions used by a module would be evx_post to post an event, evx_receive to receive an event, evx_ack to acknowledge a received event, evx_swwait to wait for an event to arrive, and evx_swget to get a list of receive ports with pending events. Note again that the use of semaphore-wait objects allows a decoupling between the specification of events of interest from waiting for events to arrive, thus addressing known scaling problems with interfaces similar to the "select" system call used in Unix.

Utilizing the present invention for many types of application development yields reduced complexity, easier reconfiguration and extensibility, and high performance with low memory requirements. For example, it allows signaling-specific functions of a communication application to be encapsulated into a single module. A different signaling protocol only requires adding a new signaling module and adjusting module interconnections. Combining dynamic reconfiguration and dynamically loaded code in a communication device provides even more flexibility to communication software application developers.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the event exchange in the above detailed description can be implemented with a compositional application that initializes the event exchange's global state and creates sending and receiving ports for each module. However, the principles of the present invention could be extended to other application structures, for example that allow the port queues to be owned by individual modules. Such extensions could be readily implemented by one of ordinary skill in the art given the above disclosure.

What is claimed is:

1. An inter-module communication system comprising:
   a plurality of software modules;
   at least one event queue capable of event flow control associated with a connection between a sending and receiving software module;
   an event exchange system enabling arbitrary interconnections between modules such that a sending software module, without identifying a receiving software module, posts events for delivery by the event exchange to a receiving software module, wherein the receiving software module can simultaneously monitor connections to other software modules and standard operating system interfaces by communicating events received through the event exchange into operating system primitives.

2. The system of claim 1 wherein the operating system primitive is a file descriptor.

3. The system of claim 1 wherein the size of the event queue for a connection is determined dynamically.

4. The system of claim 1 wherein flow control for a connection can be turned on or off.

5. The system of claim 1 wherein the sending software module has an associated sending event queue to which events are posted for delivery.

6. The system of claim 1 wherein the receiving software module has an associated receiving event queue to which events are delivered.

7. The system of claim 1 wherein the event comprises control information.

8. The system of claim 1 wherein the event specifies data to be shared between a sending software module and one or more receiving software modules.

9. The system of claim 1 wherein the event comprises a reference to the data to be shared.

10. The system of claim 1 wherein connections between modules have a name independent of module function names or addresses.

11. The system of claim 1 wherein events posted by the sending module are delivered to multiple receiving software modules.

12. The system of claim 1 further comprising a plurality of sending modules wherein events posted by the sending modules are delivered to a single receiving software module.

13. The system of claim 1 wherein connections between software modules are specified by a connection table.

14. The system of claim 1 wherein connections between software modules are determined by each software module automatically.

15. The system of claim 1 wherein one or more connection modules allow other software modules to be dynamically added or removed from the system.

16. The system of claim 1 wherein the receiving software module can monitor multiple connections to other software modules by specifying a wait structure.

17. A method of facilitating communication between a plurality of software modules comprising the steps of:
   receiving an event posted by a sending software module, which does not identify a receiving software module;
   consulting connection information that describes established connections capable of flow control between the software modules in an event exchange; and
   delivering the event to a receiving port associated with a receiving software module in accordance with the connection information, wherein the receiving software module can simultaneously monitor connections to other software modules and standard operating system interfaces by communicating events received through the event exchange into operating system primitives.

18. The method of claim 17 wherein the operating system primitive is a file descriptor.

19. The method of claim 17 wherein the event exchange has a queue for a connection that can be determined dynamically.

20. The method of claim 17 wherein flow control for the connection can be turned on or off.

21. The method of claim 17 wherein the sending software module has an associated sending event queue to which events are posted for delivery.

22. The method of claim 17 wherein the receiving software module has an associated receiving event queue to which events are delivered.

23. The method of claim 17 wherein the event comprises control information.

24. The method of claim 17 wherein the event specifies data to be shared between a sending software module and one or more receiving software modules.

25. The method of claim 17 wherein the event comprises a reference to the data to be shared.

26. The method of claim 17 wherein connections between software modules have a name independent of module function names or addresses.

27. The method of claim 17 wherein events posted by the sending software module are delivered to multiple receiving software modules.

28. The method of claim 17 wherein events posted by multiple sending software modules are delivered to a single receiving module.

29. The method of claim 17 wherein the connection information is specified by a connection table.

30. The method of claim 17 wherein the connection information is determined by each software module automatically.

31. The method of claim 17 wherein one or more connection modules allow other software modules to be dynamically added or removed from the system.

32. The method of claim 17 wherein the receiving software module can monitor multiple connections to other software modules by specifying a wait structure.

* * * * *